United States Patent [19]
Helms et al.

[11] 3,713,636
[45] Jan. 30, 1973

[54] INCENDIARY CUTTING TORCH FOR UNDERWATER USE

[75] Inventors: Horace H. Helms, Silver Spring; Alexander G. Rozner, Bethesda, both of Md.; Dana E. Spencer, Alexandria, Va.

[73] Assignee: The United States of America as represented by the Secretary of the Navy

[22] Filed: Sept. 22, 1970

[21] Appl. No.: 74,434

[52] U.S. Cl. .............................266/23 NN, 102/37.8
[51] Int. Cl. .............................B23k 7/00, C06d 1/10
[58] Field of Search .....266/23 P, 23 R, 23 F, 23 HH, 266/23 NN; 102/37.8, 52, 54; 431/158, DIG. 25; 126/263; 175/14; 239/309; 222/541

[56] References Cited

UNITED STATES PATENTS

| | | |
|---|---|---|
| 2,035,185 | 3/1936 | Nichols..........................102/37.8 UX |
| 2,836,172 | 5/1958 | Ginsburgh et al. ..............102/37.8 X |
| 3,051,085 | 8/1962 | Finkelstein..........................102/37.8 |
| 3,273,754 | 9/1966 | Lindley..............................222/541 X |

Primary Examiner—Robert D. Baldwin
Attorney—R. S. Sciascia and J. A. Cooke

[57] ABSTRACT

An incendiary torch having a cylindrical housing with a nozzle positioned at one end thereof. The nozzle is held in place by a retainer cap threadedly attached to the housing which includes a diaphragm overlying the aperture in the nozzle thereby preventing the ambient environment from entering the torch chamber. The end of the torch housing may be connected to a work holding device.

5 Claims, 5 Drawing Figures

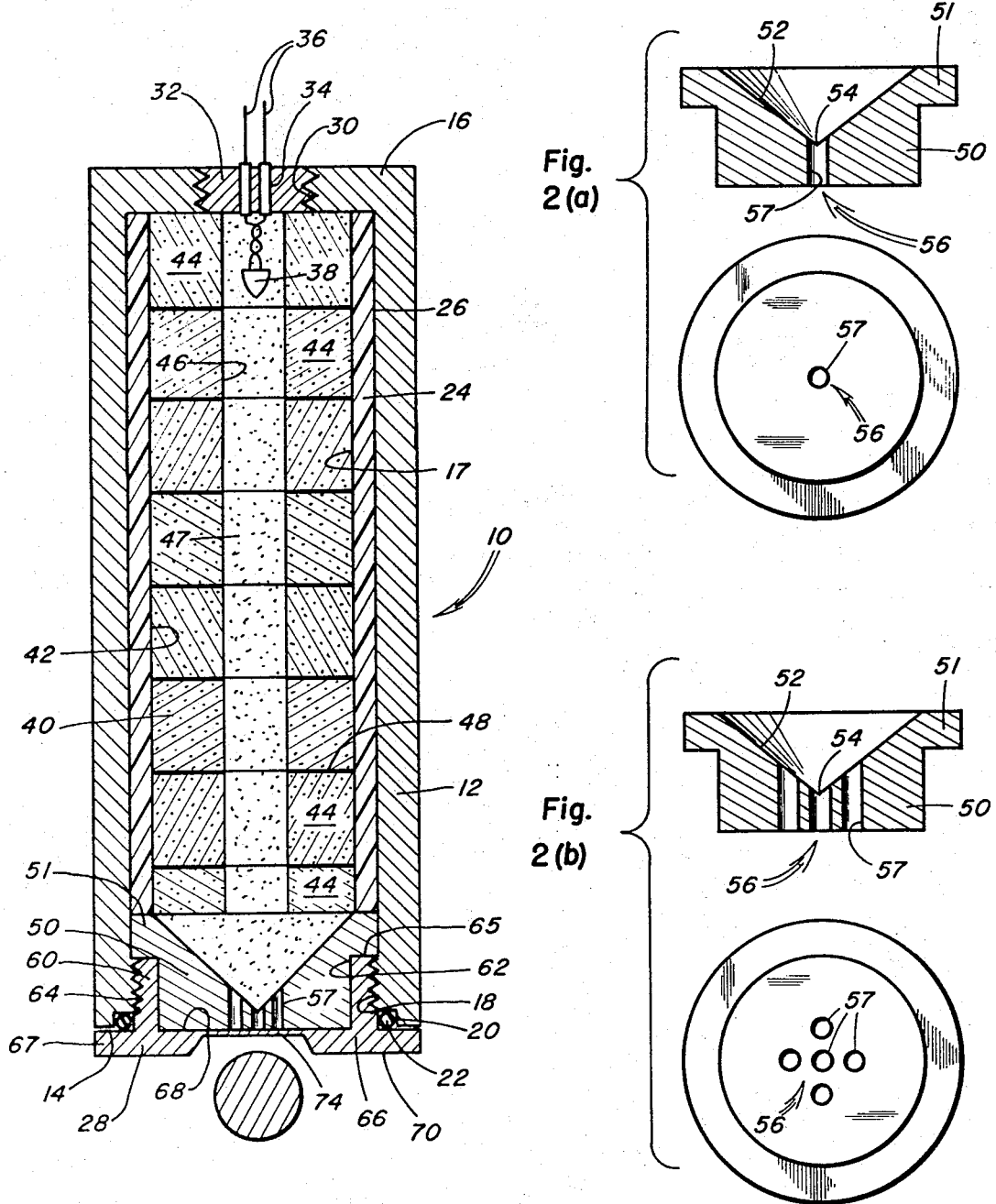

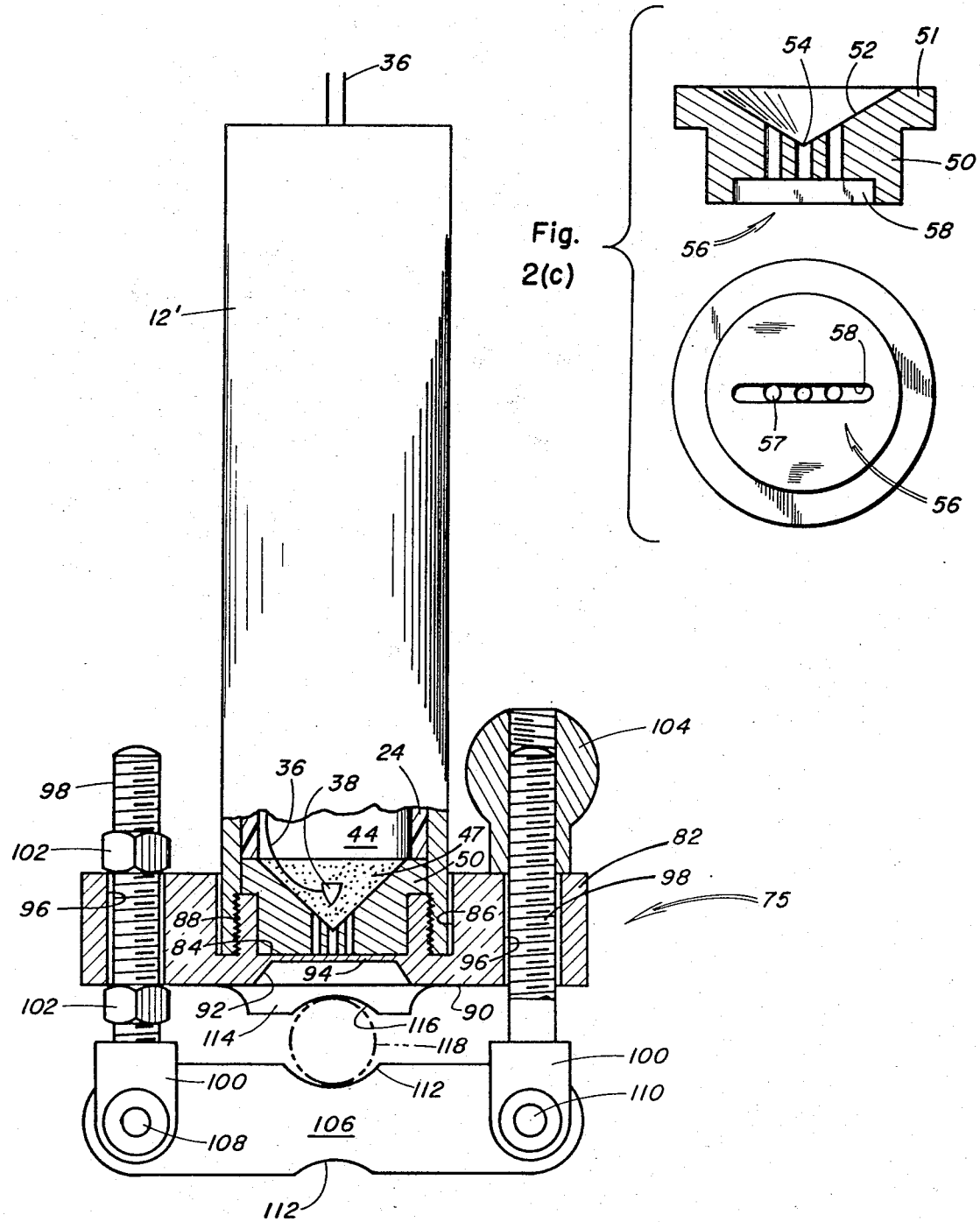

INCENDIARY CUTTING TORCH FOR UNDERWATER USE

BACKGROUND OF THE INVENTION

This invention relates generally to pyrotechnic cutting devices and more particularly to a pyrotechnic torch.

It has been found necessary in such work as clearing or salvage operations that relatively thick objects made of metal, ceramic, plastic, or the like must be cut through in a very short length of time. Such operations often take place in underwater environments, such for example, as in the salvaging of sunken vessels. Additionally, operations of this nature must often be accomplished in extremely short time intervals for various reasons such as, for example, in the case of underwater work, the lack of sufficient supplies of air available to the operator to enable him to spend extended periods of time beneath the surface.

In the past, various torch devices have been designed, some specifically to perform in underwater environments. Whether these prior torches have used gaseous or liquid fuel components, they operate on the common principle that the cutting energy is transferred from the torch to the work by means of jets of gas produced within the torch by some chemical reaction. For instance, in "gas cutting" both above and beneath the water, heat is supplied by burning a mixture of oxygen and a suitable combustible gas, such, for example, as acetylene. The gases are mixed in a torch, the tip of which is usually made with a central orifice for the oxyacetylene-cutting jet. When used in underwater environments this type of cutting torch must be surrounded by a protecting bell through which compressed air is forced to evacuate the immediately surrounding area of water.

Various difficulties arise with the use of torches of the type referred to hereinbefore. For example, the volume of oxygen (in cubic feet per hour at 1 atm and 70°C) necessary to cut heavy sections of material ranges from 80 to 120 times the thickness (measured in inches) of the material to be cut. Together with the acetylene supply, the supply tanks become quite bulky and hard to manage, especially when used underwater. The cutting speeds attained are relatively slow, ranging between 6 and 2 inches per minute depending upon the thickness of the material to be cut. Higher speeds often result in the loss of the cut and consequent spoilage of the material. Some gases, such as acetylene, cannot be used at pressures above 15 psig for safety reasons and, therefore, their use in underwater cutting at any substantial depths is severely limited. Further, oxyacetylene torches have not proved to be an effective cutting device for copper and aluminum workpieces.

SUMMARY OF THE INVENTION

Accordingly, one object of this invention is to provide a new and improved incendiary cutting device.

Another object of the present invention is to provide a new and improved incendiary torch for use in underwater environments.

Still another object of the present invention is to provide a new and improved incendiary torch for use at relatively great depths beneath the surface.

A further object of the instant invention is to provide a new and improved underwater cutting torch which will cut through thick material relatively quickly.

A still further object of the instant invention is to provide a new and improved incendiary device which can effectively pierce through or destroy a particular material.

Another still further object of the instant invention is to provide a new and improved underwater cutting torch which is both compact, inexpensive and easy to handle.

Still another further object of this invention is the provision of a cutting torch readily attachable to a work-holding device.

Briefly, in accordance with one embodiment of this invention, these and other objects are attained by providing a torch having a chamber and an appropriate nozzle through which a high velocity jet produced by reactants contained therein is directed which impinges against the workpiece thereby cutting the same.

BRIEF DESCRIPTION OF THE DRAWING

A more complete appreciation of the invention and many of the attendant advantages thereof will be readily appreciated as the same becomes better understood by reference to the following detailed description when considered in connection with the accompanying drawings wherein:

FIG. 1 is a cross-sectional side view of the incendiary torch of the present invention;

FIGS. 2a–c illustrate various nozzle designs which may be used in the torch of the present invention; and FIG. 3 is a partial cross-sectional view of the torch of FIG. 1 attached to a workpiece holder.

DESCRIPTION OF THE PREFERRED EMBODIMENT

Referring now to the drawings wherein like reference characters designate identical or corresponding parts throughout the several views, and more particularly to FIG. 1 thereof wherein the incendiary torch 10 of the present invention is shown as including cylindrical housing 12 having an open end 14, a substantially closed end 16 and a cylindrical bore 17 along the length thereof. The open end 14 is provided with an internal thread 18 extending a short distance into the elongate bore 17. An annular groove 20 is formed in the inner edge extremity of end 14 which cooperates with thread 18 and provides a seat for a conventional O-ring seal 22.

A tubular liner 24 formed of heat resistant material such, for example, as graphite or a phenolic, may be slidably positioned within bore 17, the liner 24 having an outer surface 26 which conforms to the surface of bore 17 of housing 12. Axial movement of liner 24 is limited by the closed end 16 of housing 12 and the upper surface of nozzle 50 as will be discussed in greater detail hereinafter.

The closed end 16 of housing 12 has a threaded bore 30 formed centrally therein which is adapted to threadably receive a cylindrical plug 32 having cooperating threads formed on the external surface thereof. The plug 32 has a pair of cylindrical bores 34 formed therein for passage of insulated electrical conductors 36 whose purpose will be explained in greater detail hereinafter. The conductors 36 are fixed within bores 34 by conventional means such as a suitable potting compound which will withstand relatively high internal pressure. A conventional electroresponsive squib device 38 is connected to the internal ends of conductors 36.

The inner surface 42 of liner 24 defines an axial chamber 40 which is filled with fuel in the form of a plurality of cylindrical pellets 44 the composition of which will be discussed in greater detail hereinafter. The pellets may be of a solid type stacked one upon the other in the axial chamber 40 in which case the conductors 36 must be positioned along the inside surface of liner 24 and lead to the lower portion of the torch where the squib device 38 is positioned beneath the lowermost pellet 44 (as seen in FIG. 3). Alternatively, the pellets 44 may have a central circular bore 46 formed therein and upon stacking the pellets in the chamber 40 (as seen in FIG. 1) bores 46 are aligned thereby forming a single elongate bore which extends from the closed end 16 of housing 12 to a point substantially adjacent the end of liner 24. In this case the squib device 38 may be positioned to be situated within the bore 46 of the uppermost pellet 44 and interposed between adjacent pellets are layers 48 of a burning resistant material such, for example, as magnesium oxide paint for reasons which will become clearer as the operation of the torch is more fully described. The elongate bore formed by the alignment of bores 46 is filled with a powder 47 of the same composition as pellets 44 as is the cavity formed below the lowermost pellet.

The fuel pellets 44 and heat resistant liner 24 are retained in position within the housing 12 by means of cylindrical nozzle 50 in cooperation with retainer cap 28.

As illustrated by FIG. 2, the nozzle 50 may be any one of a number of nozzle configurations including an integral annular flange 51 at the upper end thereof and having a tapered bore 52 in one face which reaches an apex, as at 54, substantially midway along the axial length thereof. The type of cut desired to be performed by the torch on a workpiece will determine the geometric configuration of the nozzle aperture 56. FIG. 2a illustrates a single hole nozzle wherein a single central bore 57 is axially formed in the nozzle for use in small diameter, relatively deep penetration of the work. Nozzles, such as those shown in FIG. 2b where, for example, five bores 57 are formed, may be used to create much larger diameter openings in targets. The nozzle of FIG. 2c, having narrow elongated slots, such as 58 cooperating with the bores 57 enable continuous line-cuts in plate or most efficient cutting of cables, chains or the like.

Returning to FIG. 1, the nozzle 50 is fitted into the open end 14 of housing 12 and fits within chamber 40. The nozzle 50 is retained in this position by the retainer cap 28 which functions as a nozzle receiving cup device defined by a cylindrical wall portion having a smooth inner surface 62, a threaded outer surface 64 and an upper edge 65. An integrally formed bottom portion 66 closes one end of the cylinder 60 and further forms a circumferentially extending flange 67. The bottom portion 66 has a planar inner surface 68 and an outer surface 70 which is beveled inward to define a centrally disposed, relatively thin diaphragm 74 which overlies bores 57 thereby preventing the ambient environment from entering into the torch chamber through the nozzle 50. As noted hereinbefore, the nozzle 50 fits within the cylindrical wall 60 of the retainer cap 28. The bottom surface of the nozzle is held flush against the inner surface 68 while the lower surface of nozzle flange 51 rests upon the upper surface of retainer cap 28. The threaded outer surface 64 of the retainer cap 28 is adapted to be threadably engageable with the internal threads 18 of housing 12. Before the retainer cap is threadably engaged to the torch housing 12, the O-ring seal 22 is positioned within the annular groove 20 and is fixedly held therein by the flange 67 of bottom portion 66 when the retainer cap 28 is in its working position. It is to be particularly noted that the upper surface of flange 67 does not abut the lower surface of cylinder 12 thereby enabling a viable seal to be achieved by the cooperation of the retainer flange 67 and O-ring 22.

Referring now to FIG. 3, a modified version of the torch 10 is shown as being affixed to one of many types of conventional work-holding devices, generally identified as 75, threadedly connected to the bottom of torch housing 12'. Nozzle 50 is held within housing 12 constraining a liner 24 which is positioned within the housing in the same manner as liner 24 in FIG. 1. Work-holding device 75 includes a substantially rectangular upper holder member 82 which serves both the function of the retainer cap 28 of FIG. 1 and also of a vise-type member to fixedly hold a workpiece in position for cutting. A circular central cavity 84 is formed in the holder member 82 in which nozzle 50 is adapted to be positioned. An annular channel 86 is formed coaxially with the cavity 84 having a threaded wall 88, the channel being formed so as to be threadably connectable to the torch housing 12'. The lower surface 90 of the upper holder member 82 is beveled as at 92 thereby defining a circular diaphragm portion 94 located immediately below the cavity 84. Thus, it can be seen that upon threadedly engaging the torch housing 12' with the upper holder 82, the latter acts similarly to the retainer cap 28 of FIG. 1 by retaining the nozzle 50 fixed in place. Conventional thread sealant (not shown) of nylon, for example, may be positioned around threads 88 to provide a watertight seal.

Formed in each corner of the upper holder member 82 is a circular bore 96 through which passes an externally threaded elongate cylindrical rod 98 having a bifurcated end 100. Two adjacent rods 98 (only one shown) are constrained against movement by a pair of threaded nuts 102 engaged with rod 98 and are adapted to cooperate with the upper and lower surfaces of the holder member 82 thereby prohibiting any substantial axial movement of the rods. The remaining two rods 98 (only one of which is shown) are movably held in position by internally threaded nut members 104 threadably engaged to the rods and abutting the upper surface of holder member 82. The nut members 104 include enlarged portions to facilitate manual rotation thereof thereby raising or lowering rods 98 in an obvious manner.

Pivotally connected to the bifurcated ends 100 of rods 98 are a pair of transverse bar members 106, each bar member having an end, such as 108 pivoted to a fixed rod member with the opposite end, such as 110, pivoted to a movable rod member. Centrally disposed on each bar member 106 and on opposite sides thereof are a pair of cut out portions 112 of arcuate configuration of different radii. Positioned immediately above each cutout portion 112 and fixed to the lower surface 90 of holder member 82 is a guide member 114 having an arcuate shaped surface 116 formed therein. The arcuate surfaces 112 and 116 may cooperate to hold a workpiece such, for example, as a cable or pipe 118 as shown in phantom in FIG. 3. After the workpiece is placed between the upper holder member 82 and the transverse bar members 106, nut members 104 are rotated in a suitable direction thereby drawing rods 98 upward resulting in a vise-like action between the arcuate surfaces. Should a workpiece be too large to easily fit within the work holding device 75, nuts 102 may be appropriately rotated thereby increasing the space between bars 106 and holder member 82.

The fuel pellets 44 utilized in the torch comprise an elemental mixture of nickel, aluminum, ferric oxide and Teflon, combined in proper proportions as more fully described in copending application Serial No. 49,980 filed June 25, 1970 entitled "Pyrotechnic Composition" by Horace H. Helms, Jr. and Alexander G. Rozner. By using standard powder metallurgy techniques, compacted pellets are produced from this material. After positioning the fuel pellets 44 in the torch chamber 40 with inhibitor paint layers interposed between adjacent pellets as discussed hereinbefore, the bore 46 is filled with the powder 47 extending into the tapered bore 52 of nozzle 50 thereby forming a continuous column of uncompressed fuel material as seen in FIG. 1.

Upon connecting an electrical energy source to the conductors 36 which may be accomplished, for example, by remote control, the electroresponsive squib 38 is actuated thereby igniting the column of fuel powder 47 along its entire length substantially simultaneously. This ignition initiates the reaction of the fuel pellets 44 as discussed hereinafter. In the embodiment shown in FIG. 1, it is desired to have the pellets propagate in a radial fashion to insure a reasonably uniform pressure distribution in the torch chamber 40 and the inhibiting layers 48 thereby prevent any substantial axial propagation from occuring.

Upon initiation of the reaction of fuel pellets 44, an instantaneous exothermic reaction is undergone during the subsequent alloying and oxidation of the elements. The diaphragm 74 assures that the torch is sealed, both internally and externally, so that the gas pressure is maintained. The reaction will go to completion whether it be located underwater, above surface, or in outer space. The Teflon, in the presence of the large quantities of heat produced, decomposes into a gas thereby increasing the pressure within the torch considerably. When the pressure inside the torch exceeds the strength of the diaphragm, the diaphragm fractures and the expanding gases will force the molten material through the nozzle. Temperatures in the range of 2400° C to 3200° C result from this reaction and these high temperatures coupled with the high jet velocity of the molten metal forced through the nozzle 50 by the great pressure produced within the torch provides a cutting action which in almost all cases achieves the desired cut in no more than one second. Should the alternative of solid cylindrical fuel pellets be utilized as shown in FIG. 3, the chemical reaction would proceed in an axial fashion in an upward direction within the torch chamber since ignition would occur at the lowermost portion of the torch.

The housing 12 should be of sufficient thickness to withstand the internal pressurization of the chamber 40 following ignition. After ignition within the torch, internal pressure builds up rapidly in the chamber 40 due to expanding gases until a predetermined upper limit is reached whereupon the diaphragm 74 is broken and the molten jet is released at a high velocity.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. A tool adapted to be used as a cutting torch comprising:
   a fuel receiving chamber formed in a tubular housing having a closed end and an open end;
   a nozzle connected to the open end of the tubular housing and having at least one aperture therethrough communicating with said fuel receiving chamber;
   fastener means in the open end of the housing for receiving said nozzle;
   a diaphragm coupled to said fastener means for sealing said nozzle aperture in a closed mode and adapted to withstand a predetermined internal pressure;
   an electroresponsive squib contained within said fuel receiving chamber at the closed end thereof; and
   remotely controllable means external to said housing for activating said electroresponsive squib.

2. The tool as recited in claim 1 further including a solid fuel composition positioned within said fuel receiving chamber which upon ignition reacts to form a molten liquid which exits from said nozzle as a high velocity jet.

3. An incendiary cutting torch adapted for use underwater comprising:
   a cylindrical housing having an elongate cylindrical bore formed the length thereof defining a fuel receiving chamber and having an open end and a closed end;
   a solid fuel composition positioned within said fuel receiving chamber;
   an electroresponsive squib embedded in said solid fuel composition;
   a nozzle detachably connected to said open end of said housing and having at least one aperture therein;
   a retaining member connected to said open end of said housing having a cylindrical cavity portion formed therein to receive said nozzle and a bottom portion integral therewith effectively closing said open end; and
   a diaphragm integral with said retaining member adapted to withstand a predetermined internal pressure within said fuel receiving chamber.

4. An incendiary torch as recited in claim 3 wherein said elongate cylindrical bore has a burning resistant liner positioned on the surface thereof.

5. An incendiary torch as recited in claim 3 wherein:
   said bottom portion of said retaining member is provided with a pair of guide members having shaped surfaces formed therein to receive appropriate workpieces;

a pair of transverse bar members connected to said retaining member and adapted to be movable towards or away from said retaining member by a plurality of threaded rod members.

* * * * *